United States Patent
Lang et al.

(10) Patent No.: US 9,238,437 B2
(45) Date of Patent: Jan. 19, 2016

(54) PICKUP TRUCK STORAGE COMPARTMENTS WITH EXTERIOR ACCESS DOORS

(71) Applicants: Harry Lang, Jacksonville, FL (US); Donnie Mangrum, Jacksonville, FL (US)

(72) Inventors: Harry Lang, Jacksonville, FL (US); Donnie Mangrum, Jacksonville, FL (US)

( * ) Notice: Subject to any disclaimer, the term of this patent is extended or adjusted under 35 U.S.C. 154(b) by 0 days.

(21) Appl. No.: 14/279,262

(22) Filed: May 15, 2014

(65) Prior Publication Data

US 2014/0339845 A1    Nov. 20, 2014

Related U.S. Application Data

(60) Provisional application No. 61/823,450, filed on May 15, 2013.

(51) Int. Cl.
| | | |
|---|---|---|
| B62D 33/02 | (2006.01) | |
| B60R 5/04 | (2006.01) | |
| B60R 9/06 | (2006.01) | |

(52) U.S. Cl.
CPC ... B60R 5/04 (2013.01); B60R 9/06 (2013.01); B62D 33/02 (2013.01); *Y10T 29/49826* (2015.01)

(58) Field of Classification Search
CPC ............ B60R 5/04; B60R 5/041; B60R 9/06; B60R 9/065; B60R 13/01; B60R 9/02; B60R 2013/016; B62D 33/02; B62D 33/023
USPC ................................................ 296/39.2, 37.6
See application file for complete search history.

(56) References Cited

U.S. PATENT DOCUMENTS

| | | | | |
|---|---|---|---|---|
| 4,135,761 | A * | 1/1979 | Ward | 296/37.6 |
| 4,685,695 | A * | 8/1987 | LeVee | 280/441.2 |
| 5,593,201 | A * | 1/1997 | Bateman | 296/100.02 |
| 5,735,565 | A * | 4/1998 | Papai et al. | 296/39.2 |
| 5,979,973 | A * | 11/1999 | Clare et al. | 296/187.12 |
| 6,030,018 | A * | 2/2000 | Clare et al. | 296/37.6 |
| 6,237,211 | B1 * | 5/2001 | Clare et al. | 29/434 |
| 6,827,385 | B2 * | 12/2004 | Mobley | 296/39.2 |
| 7,219,941 | B1 * | 5/2007 | San Paolo et al. | 296/37.6 |
| 8,827,344 | B2 * | 9/2014 | Weller | 296/39.2 |
| 2001/0038218 | A1 * | 11/2001 | Clare et al. | 296/37.6 |
| 2001/0038219 | A1 * | 11/2001 | Clare et al. | 296/37.6 |
| 2001/0038230 | A1 * | 11/2001 | Clare et al. | 296/189 |
| 2001/0052714 | A1 * | 12/2001 | Clare | 296/37.6 |
| 2004/0251704 | A1 * | 12/2004 | Rubel et al. | 296/26.01 |
| 2005/0225111 | A1 * | 10/2005 | Boyer | 296/37.6 |
| 2006/0279099 | A1 * | 12/2006 | Ranka et al. | 296/37.6 |
| 2008/0157556 | A1 * | 7/2008 | Henderson et al. | 296/37.6 |
| 2008/0191506 | A1 * | 8/2008 | Huotari et al. | 296/37.6 |
| 2009/0026786 | A1 * | 1/2009 | Reich et al. | 296/37.6 |
| 2009/0045646 | A1 * | 2/2009 | Clare et al. | 296/37.6 |
| 2009/0189404 | A1 * | 7/2009 | Anderson et al. | 296/37.6 |
| 2010/0301721 | A1 * | 12/2010 | Nebel | 312/326 |
| 2011/0037286 | A1 * | 2/2011 | Nebel | 296/37.6 |

(Continued)

*Primary Examiner* — Gregory Blankenship
(74) *Attorney, Agent, or Firm* — Mark Young

(57) ABSTRACT

Storage compartments are formed in the bed of a pickup truck using a bed liner and doors in the exterior side panels of the truck bed. The bed liner includes sidewall containers that define the storage compartments. The liner is shaped and sized to fit within the bed of the truck. Lockable access doors provide access through the exterior side of side panels of the bed to each compartment. A mechanical key actuated lock or electromechanical lock may be provided for each door. Hinges allow pivoting opening motion of the doors.

18 Claims, 12 Drawing Sheets

(56) References Cited

U.S. PATENT DOCUMENTS

| | | | |
|---|---|---|---|
| 2011/0285162 A1* | 11/2011 | Kuklok | 296/37.6 |
| 2012/0200106 A1* | 8/2012 | Villano et al. | 296/37.6 |
| 2012/0256438 A1* | 10/2012 | Watkins | 296/37.6 |
| 2014/0339845 A1* | 11/2014 | Lang et al. | 296/37.6 |

* cited by examiner to# PICKUP TRUCK STORAGE COMPARTMENTS WITH EXTERIOR ACCESS DOORS

RELATED APPLICATION

This application is a Nonprovisional and claims the benefit of priority of U.S. Provisional Application 61/823,450 filed 15 May 2013, the entire contents of which are incorporated herein by this reference and made a part hereof.

FIELD OF THE INVENTION

This invention relates generally to pickup trucks, and more particularly, to storage compartments in the bed of a pickup truck formed with a bed liner defining storage compartments accessible through doors in the exterior side panels of the truck bed.

BACKGROUND

Various storage/utility boxes have been devised for pickup truck beds. Many comprise tool boxes that consume substantial portions of the truck bed, cover at least a portion of the top of the sides of the truck bed, and provide limited access. Typically, a storage box may be accessed only from within the bed of the truck.

Some utility vehicles have beds with outward facing doors and/or drawers for accessing storage compartments formed in the bed. However, such beds are either custom-made or original equipment for utility trucks.

What is needed is a convention pickup truck bed with compartments accessible from the exterior of the truck, and preferably, compartments that are formed using a conventional pickup truck bed.

The invention is directed to overcoming one or more of the problems and solving one or more of the needs as set forth above.

SUMMARY OF THE INVENTION

To solve one or more of the problems set forth above, in an exemplary implementation of the invention, one or more storage compartments are formed in the bed of a pickup truck using a bed liner defining the storage compartments and doors in the exterior side panels of the truck.

An exemplary bed liner according to principles of the invention includes sidewall containers, a base (i.e., bottom) and a cab wall. A free edge of the webs form a flange that rests atop the top edges of the truck bed. The liner is sized to fit within the bed of the truck, with each container portion fitting along a side of the bed, without extending above the bed of the truck beyond the top of each side panel by any substantial amount. A separate tailgate liner is also provided, though not required by the invention. Each sidewall container is comprised of a generally vertical side wall or panel that extends from the base to a horizontal top web. Each top web, extends between an outer panel of the truck bed and the vertical side wall. The side walls, web, and each outer panel of the truck bed, define a compartment within the space between each side wall and its respective outer panel beneath each respective web. The flange is at about the height of the top of the panels of the truck bed. Each compartment thereby defined may cover a wheel well, which is otherwise unusable space of the truck bed. The containers do not extend much beyond the wheel wells towards the center of the bed. In a preferred embodiment, the flanges are about as long as the bed of the truck and between 2 to 18 inches wide, and more preferably between about 6 to 12 inches wide. In such a configuration, much of the truck bed remains available for conventional storage, between the containers. Apertures for each storage compartment are provided in the outwardly facing side walls of the liner. The entire outwardly facing side wall may be omitted, to form a completely open outer facing side. Alternatively, as shown in the drawings, an opening may be provided for each compartment. A bottom shelf may be provided in each compartment.

Lockable access doors provide access through the exterior side of side panels of the bed to each compartment. The size, shape and position of the door in the bed panels may vary. A mechanical key actuated lock, or electromechanical lock may be provided. Hinges allow pivoting motion of the doors, which may pivot by pivoting up, pivoting down, or pivoting to one side or another. Springs and gas cylinders may be provided to facilitate opening and hold the door 115 in an open position.

An exemplary storage system formed in a bed of a pickup truck according to principles of the invention includes a bed liner. The bed liner includes a first side container defining a first compartment. The bed includes a first sidewall and a second sidewall. The second sidewall is opposed to and spaced apart from the first sidewall. Each sidewall of the bed has an interior side and an exterior side. The first side container abuts the interior side of the first sidewall of the bed. A first aperture extends through the first sidewall of the bed. The first aperture provides access from the exterior side of the first sidewall, through the first sidewall into the first compartment of the first container. A first door is mounted at the first aperture. The first door is movable from a closed position covering the first aperture to an open position exposing the first aperture.

The bed liner may further include a second side container defining a second compartment. The second side container abuts the interior side of the second sidewall of the bed. A second aperture extends through the second sidewall of the bed. The second aperture provides access from the exterior side of the second sidewall, through the second sidewall into the second compartment of the second container. A second door is mounted at the second aperture. The second door is movable from a closed position covering the second aperture to an open position exposing the second aperture.

The first side container may further define additional compartments, such as a third compartment accessible through a third aperture extending through the first sidewall of the bed. The third aperture may be spaced apart from the first aperture. The third aperture provides access from the exterior side of the first sidewall, through the first sidewall into the third compartment of the first container. A third door may be mounted at the third aperture. The third door is movable from a closed position covering the aperture to an open position exposing the aperture. The third compartment may adjoin the first compartment or be separate and spaced apart from the first compartment.

Similarly, the second side container may further define a fourth compartment accessible through a fourth aperture extending through the second sidewall of the bed. The fourth aperture may be spaced apart from the second aperture. The fourth aperture provides access from the exterior side of the second sidewall, through the second sidewall into the fourth compartment of the second container. A fourth door may be mounted at the fourth aperture. The fourth door is movable from a closed position covering the aperture to an open position exposing the aperture. The second compartment may adjoin or be separate and apart from the fourth compartment.

A base, which serves as the floor cover of the bed liner, extends between and is attached to the first container and the second container.

A wiring conduit extends through at least a part of the first container. The wiring conduit defines a duct through which electrical wiring may be fed. The wiring may supply electrical power (e.g., 12V DC) to outlets and electrical accessories, such as lights, in one or more of the compartments.

Shelves may be provided in one or more of the compartments.

Each door may include a lock. The lock may comprise a mechanical lock or an electromechanical lock.

A method of forming a storage system in a bed of a pickup truck is also provided. The method entails providing a bed liner. The bed liner may include first and second side containers defining first and second compartments. The bed includes a first sidewall and a second sidewall. The second sidewall is opposed to and spaced apart from the first sidewall. Each sidewall of the bed has an interior side and an exterior side. The first side container is positioned in abutting relation to the interior side of the first sidewall of the bed, while the second side container is positioned in abutting relation to the interior side of the second sidewall of the bed. A first aperture is cut into the first sidewall of the bed in alignment with the first compartment. A second aperture is cut into the first sidewall of the bed in alignment with the second compartment. The first aperture extends through the first sidewall of the bed and provides access from the exterior side of the first sidewall, through the first sidewall into the first compartment of the first container. The second aperture extends through the second sidewall of the bed and provides access from the exterior side of the second sidewall, through the second sidewall into the second compartment of the second container. A first door is mounted at the first aperture. The first door is movable from a closed position covering the first aperture to an open position exposing the first aperture. A second door is mounted at the second aperture. The second door is movable from a closed position covering the second aperture to an open position exposing the second aperture. Each door is equipped with a lock.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
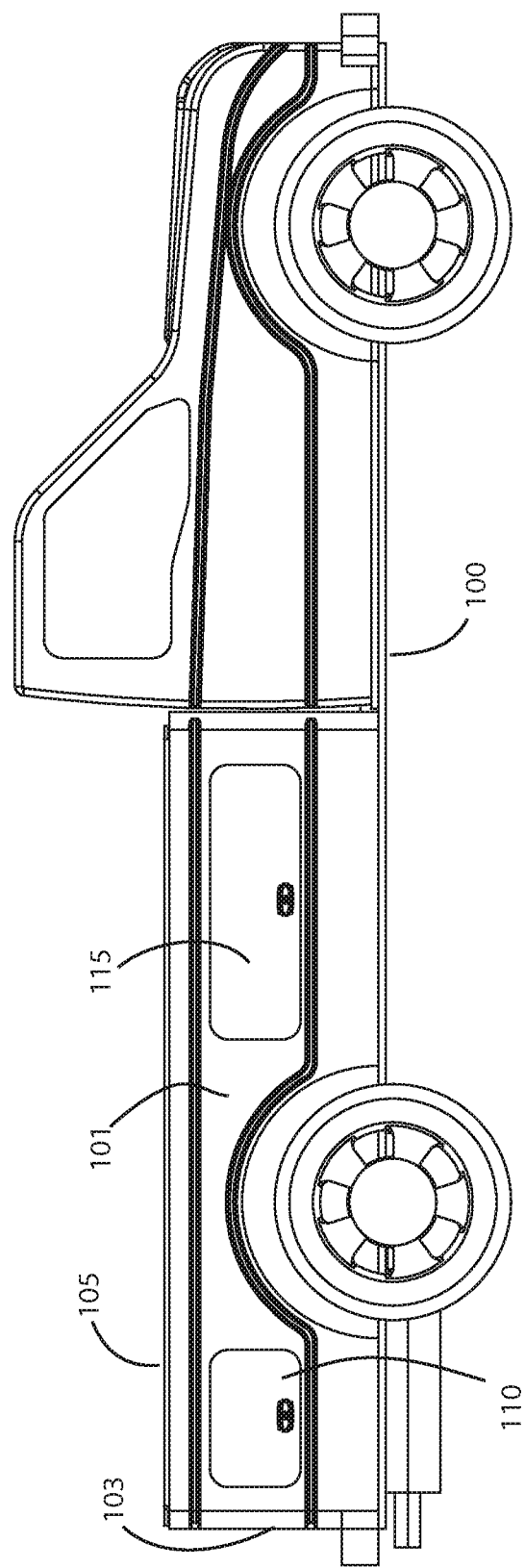
FIG. 1 is a first side view of an exemplary pickup truck equipped with storage compartments with exterior access doors according to principles of the invention.

Storage compartments are formed in the bed of a pickup truck with a bed liner that defines storage compartments and doors in the exterior side panels of the truck bed that provide access to the compartments formed by the bed liner. FIG. 1 is a first side view of an exemplary pickup truck 100 equipped with storage compartments with exterior access doors 110, 115 according to principles of the invention. The doors are formed in the exterior side panel 101 of the truck bed. A bed liner 105 lines the bed of the truck 100. A tailgate 103 facilitates access to the bed of the truck.

Figure 2:
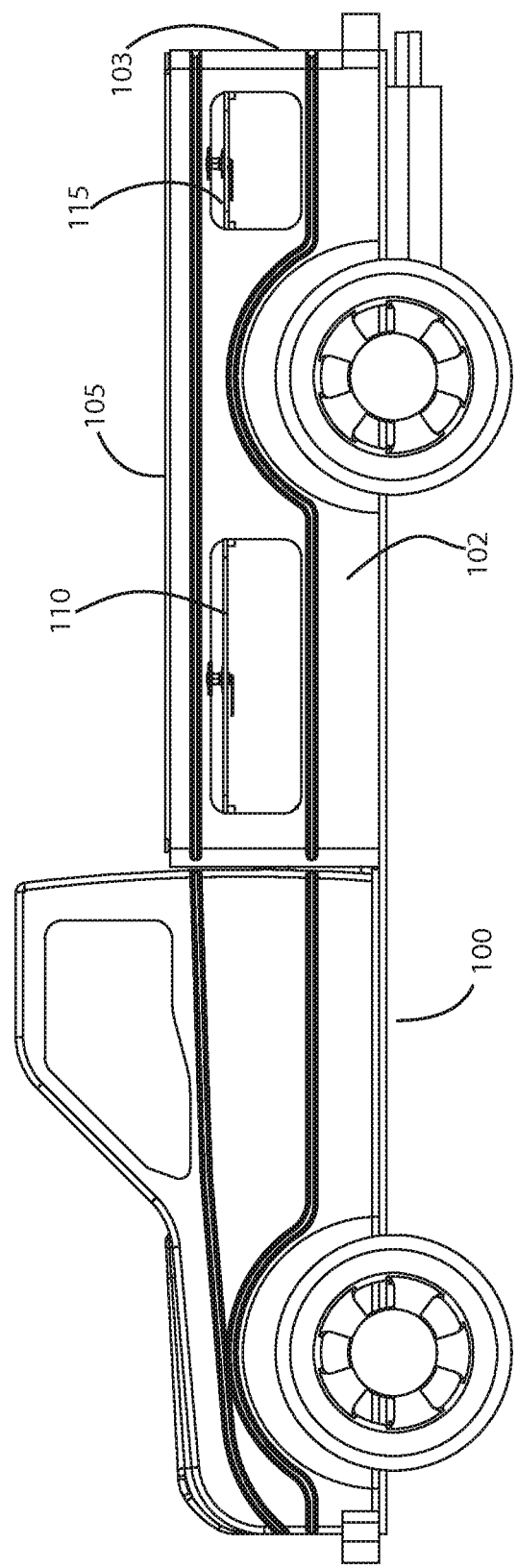
FIG. 2 is a second side view of an exemplary pickup truck equipped with storage compartments with exterior access doors according to principles of the invention.
Figure 3:
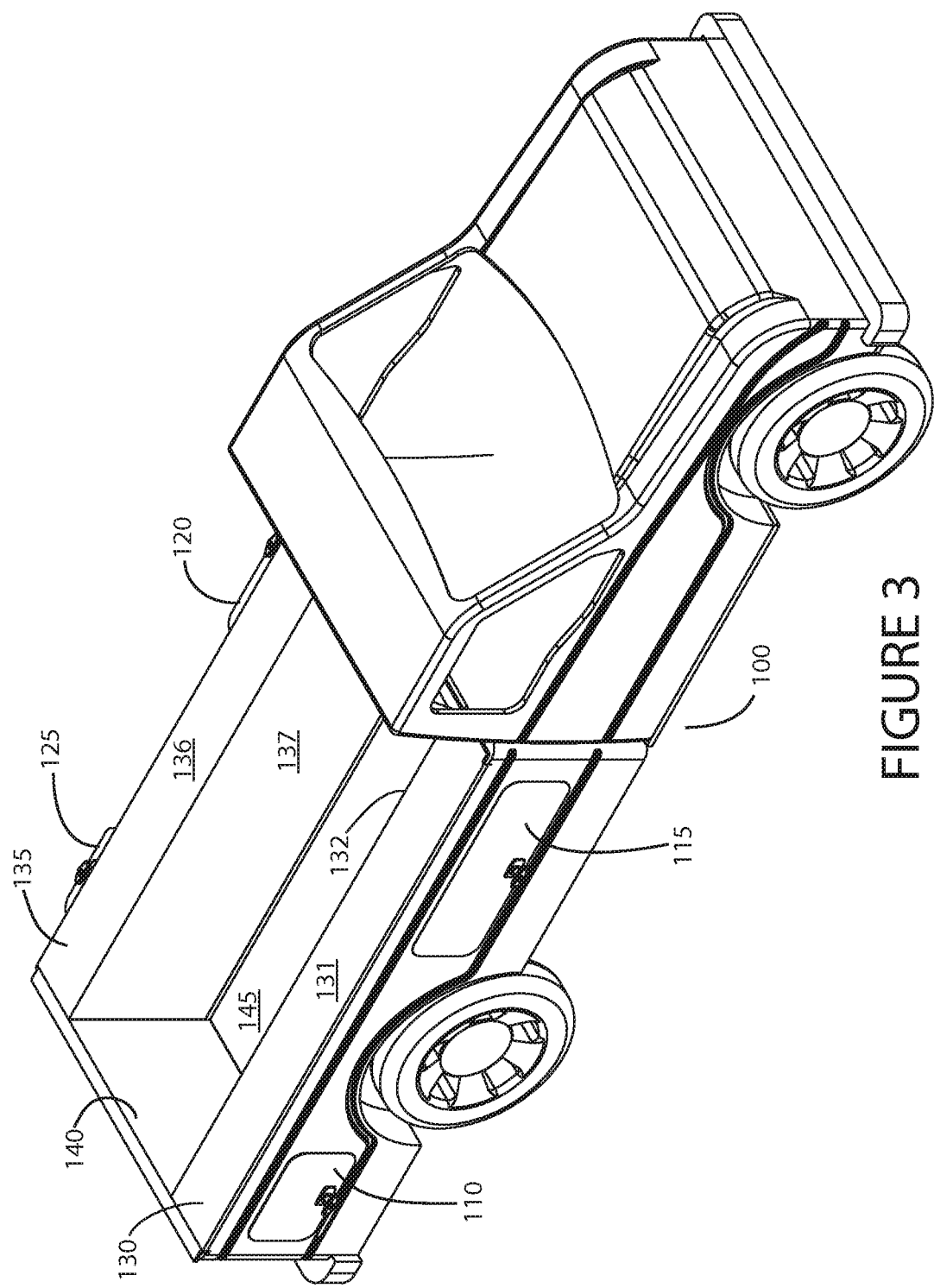
FIG. 3 is a first perspective view of an exemplary pickup truck equipped with storage compartments with exterior access doors according to principles of the invention.
Figure 4:
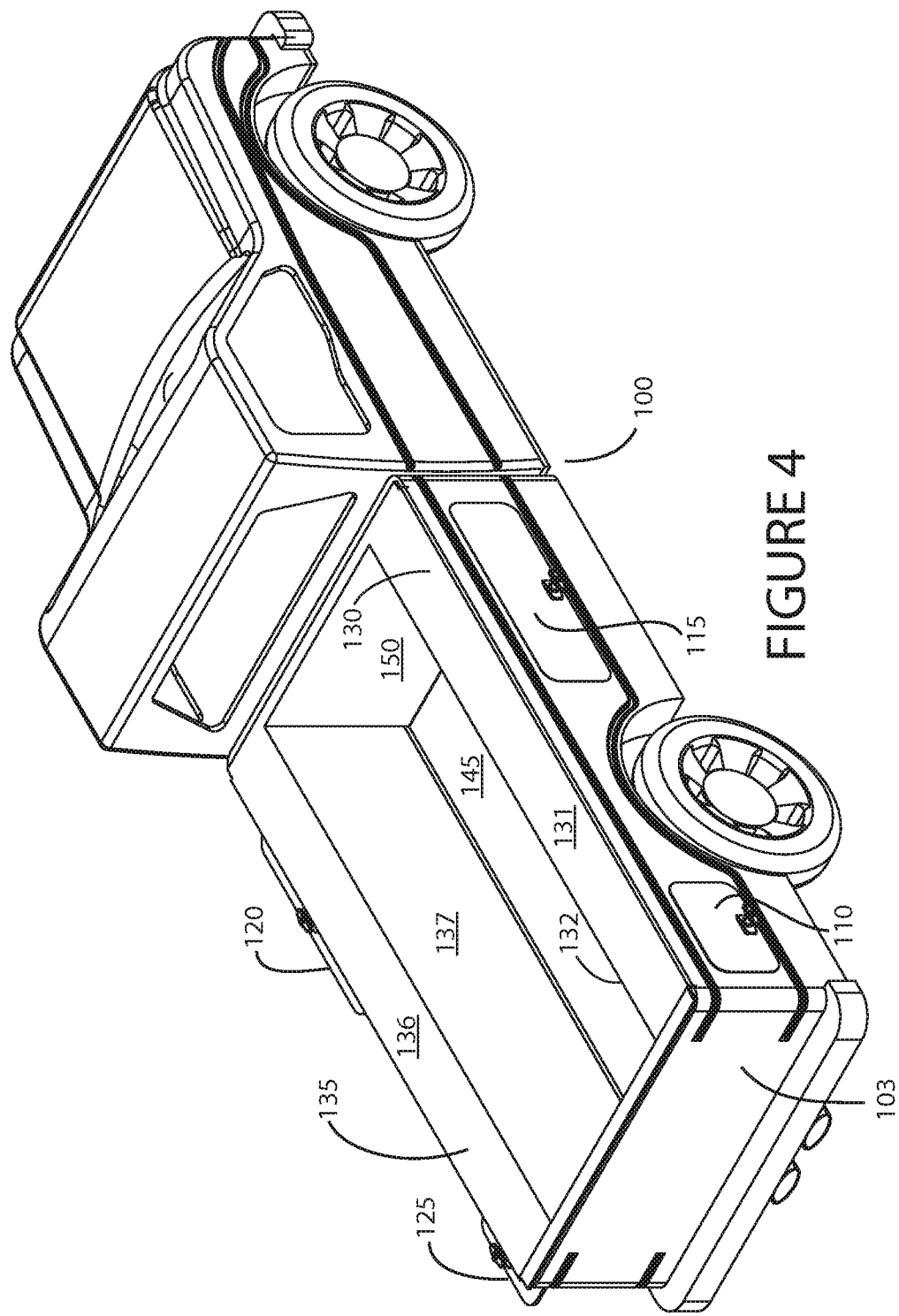
FIG. 4 is a second perspective view of an exemplary pickup truck equipped with storage compartments with exterior access doors according to principles of the invention.
Figure 5:
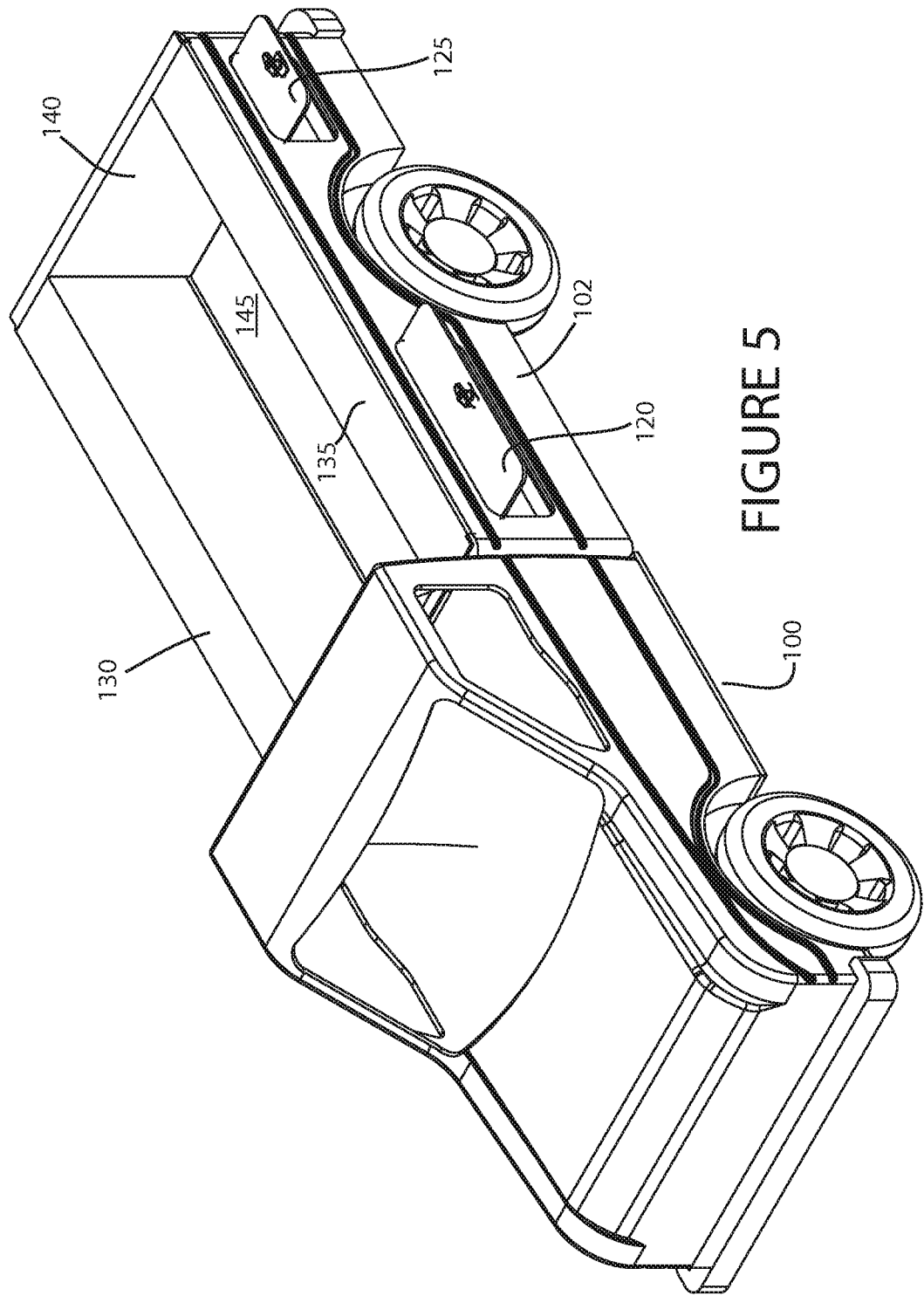
FIG. 5 is a third perspective view of an exemplary pickup truck equipped with storage compartments with exterior access doors according to principles of the invention.
Figure 6:
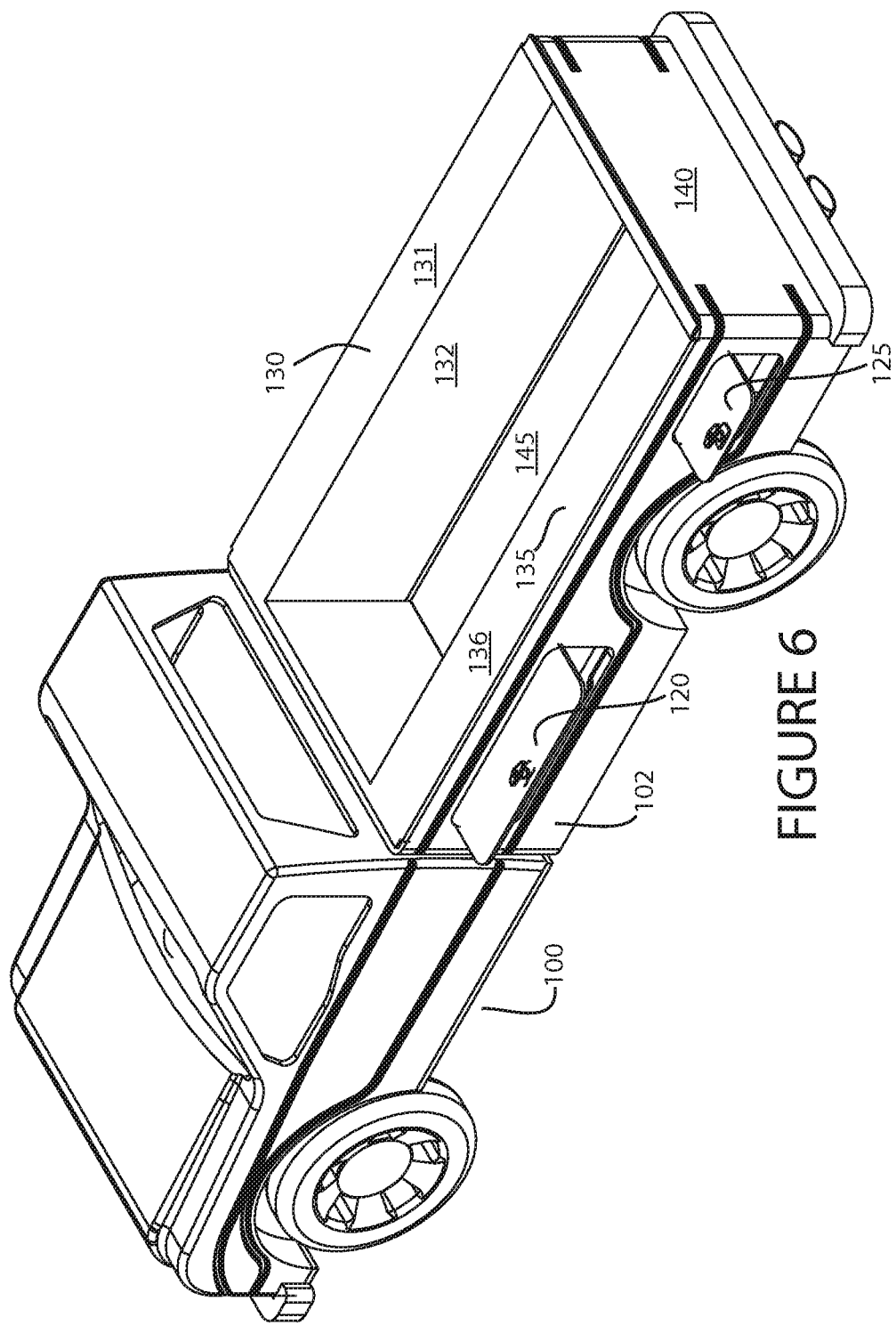
FIG. 6 is a fourth perspective view of an exemplary pickup truck equipped with storage compartments with exterior access doors according to principles of the invention.
Figure 7:
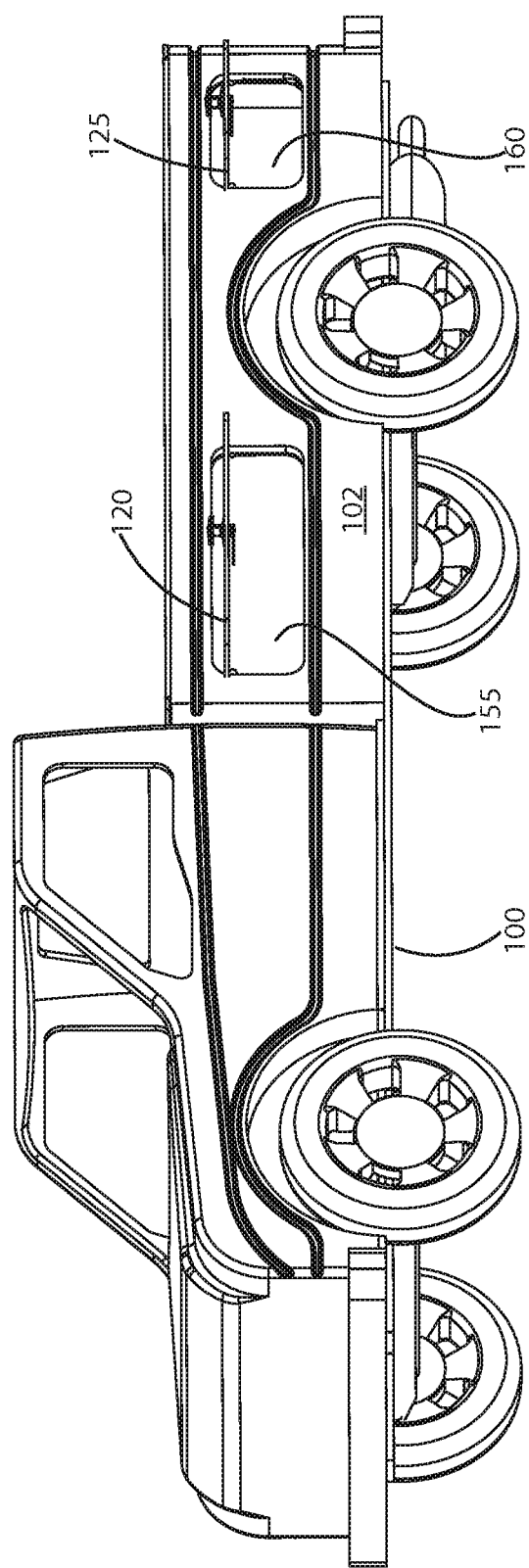
FIG. 7 is a fifth perspective view of an exemplary pickup truck equipped with storage compartments with exterior access doors according to principles of the invention.
Figure 8:
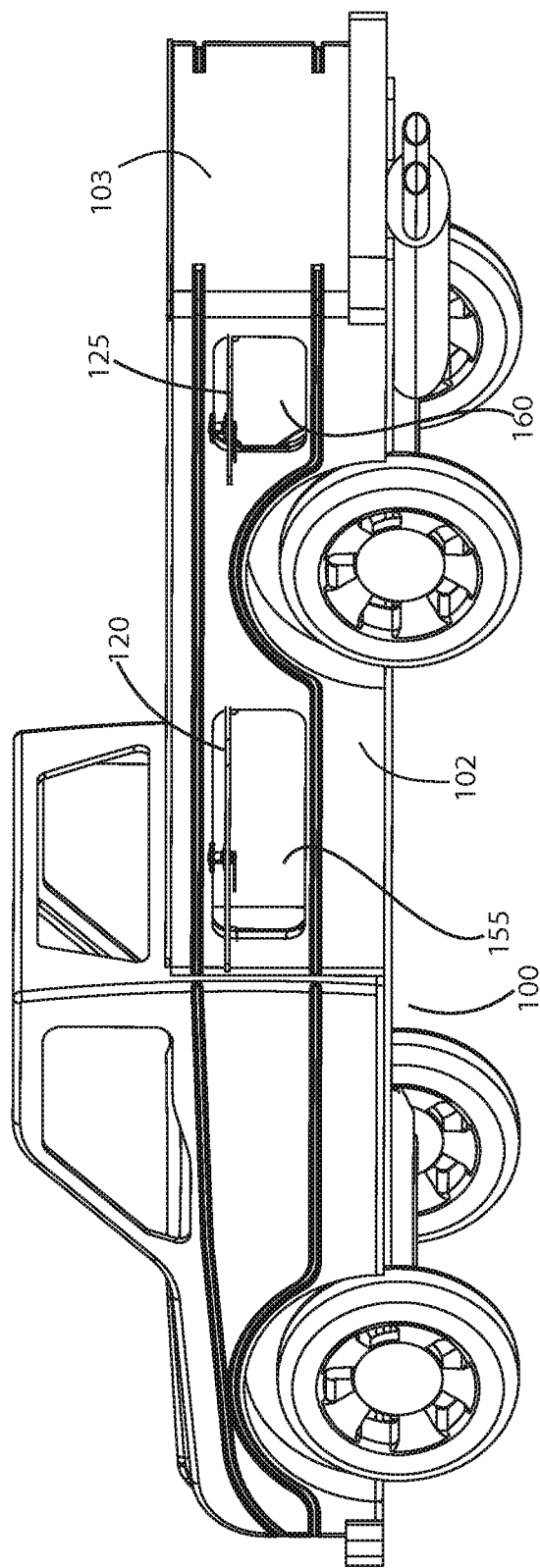
FIG. 8 is a sixth perspective view of an exemplary pickup truck equipped with storage compartments with exterior access doors according to principles of the invention.

FIG. 2 provides a side view of the opposite side of the truck 100. Again, the exemplary pickup truck 100 is equipped with storage compartments 155, 160 with exterior access doors 120, 125 shown in an open configuration. The doors 110, 115, 120, 125 are formed in the exterior side panels 101, 102 of the truck bed.

In the perspective views of FIGS. 3 through 8, structure of the bed liner 105, doors 110, 115, 120, 125 and compartments 155, 160, 165 and 170 are more clearly depicted, with compartments 165 and 170 most clearly illustrated in FIGS. 12 through 17. The bed liner 105 includes sidewall containers 130, 135, a base (i.e., bottom) 105 and a cab wall 150. Each container is sized to fit within the bed of the truck 100, along a side of the bed, without extending above the bed of the truck 100 beyond the top of each side panel 101, 102 by any substantial amount. A separate tailgate liner 140 is also provide, though not required by the invention. Each sidewall container 130, 135 is comprised of a generally vertical side wall or panel 132, 137 that extends from the base 105 to a horizontal top web 131, 136. Each top web 131, 136 extends between an outer panel 101, 102 of the truck bed and the vertical side wall 132, 137. The side walls 132, 137, web 131, 136, and each outer panel 101, 102 of the truck bed, define a compartment within the space between each side wall 132, 137 and its respective outer panel 101, 102, beneath each respective web 131, 136. The flange 132, 137 is at about the height of the top of the panels 101 of the truck bed. Each compartment thereby defined may cover a wheel well, which is otherwise unusable space of the truck bed. The containers 130, 135 do not extend much beyond the wheel wells towards the center of the bed. In a preferred embodiment, the flanges are about as long as the bed of the truck and between 2 to 18 inches wide, and more preferably between about 6 to 12 inches wide. In such a configuration, much of the truck bed remains available for conventional storage, between the containers 130, 135.

Figure 9:
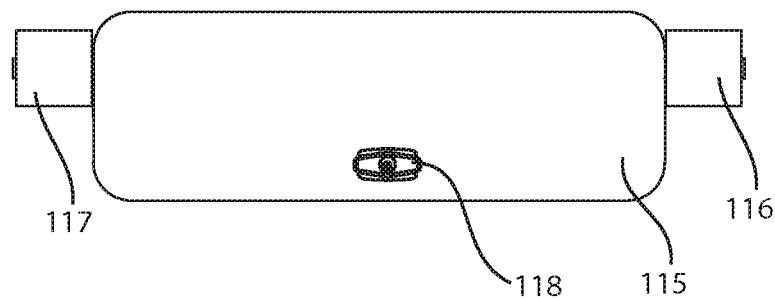
FIG. 9 is a front view of an exemplary exterior access door for a pickup truck equipped with storage compartments according to principles of the invention.
Figure 10:
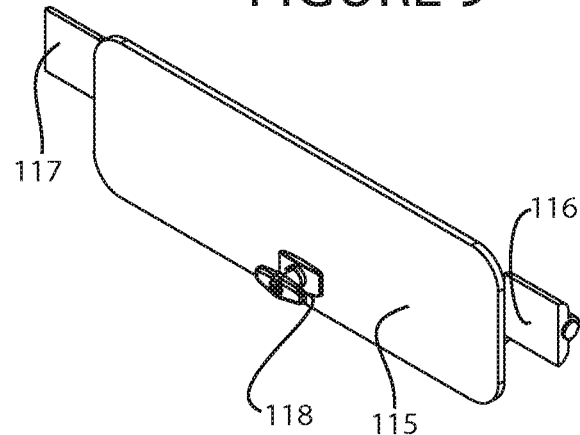
FIG. 10 is a front perspective view of an exemplary exterior access door for a pickup truck equipped with storage compartments according to principles of the invention.
Figure 11:
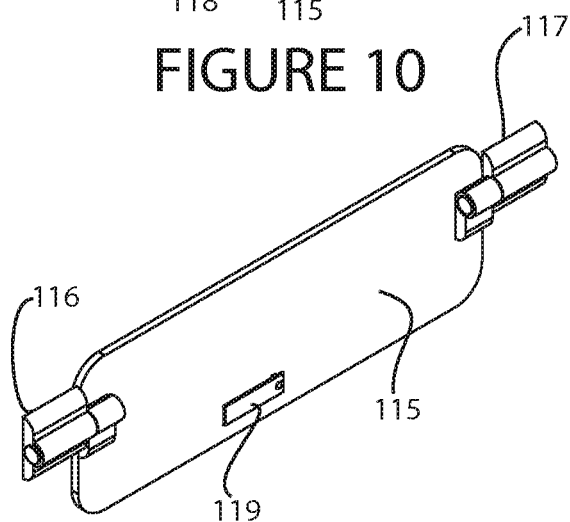
FIG. 11 is a back perspective view of an exemplary exterior access door for a pickup truck equipped with storage compartments according to principles of the invention.
Figure 12:
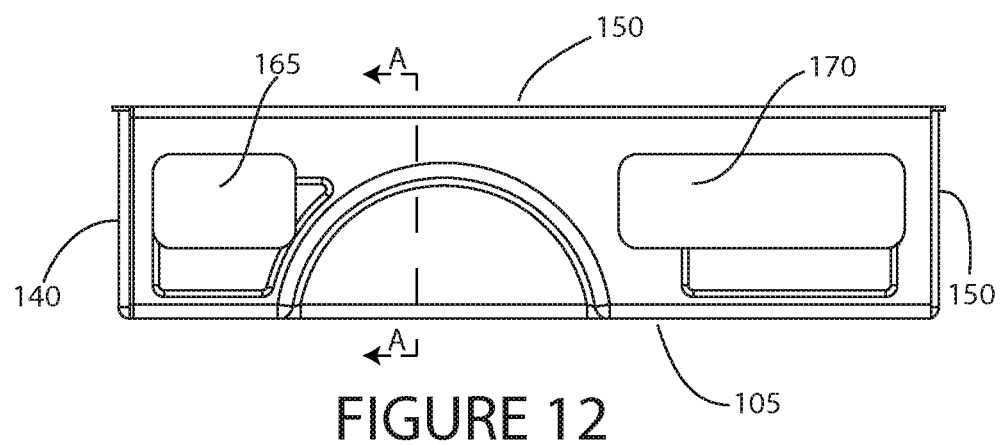
FIG. 12 is a side view of an exemplary bed liner for a pickup truck equipped with storage compartments according to principles of the invention.
Figure 13:
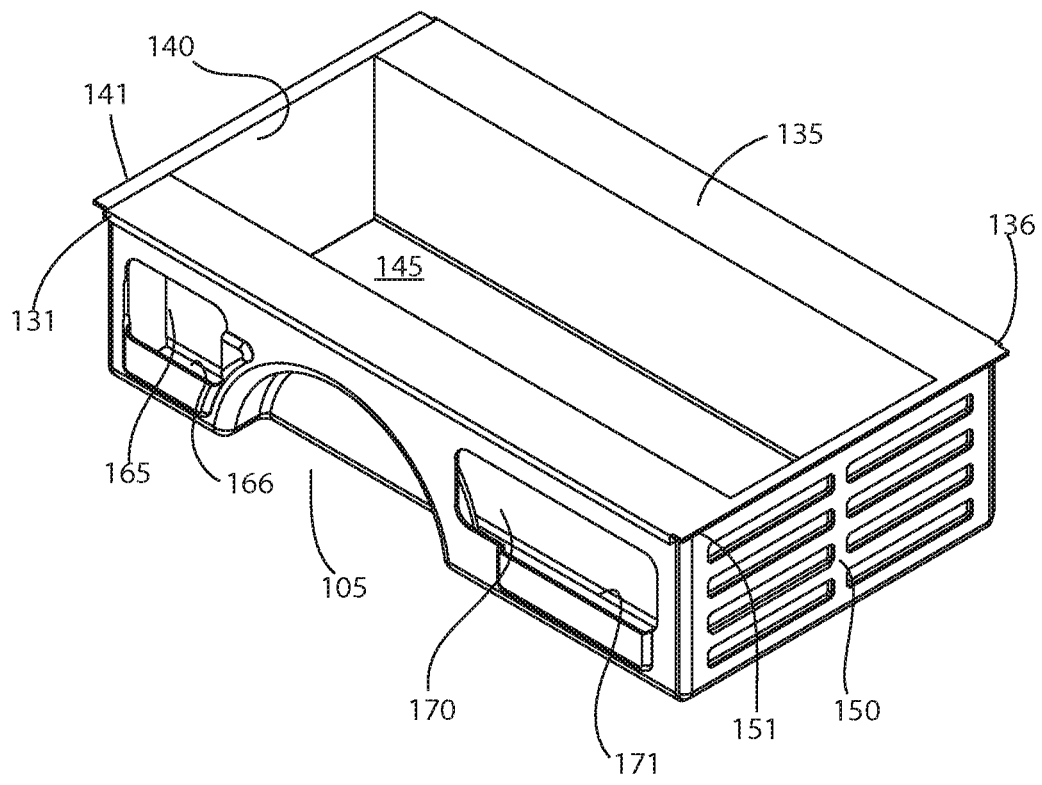
FIG. 13 is a first perspective view of an exemplary bed liner for a pickup truck equipped with storage compartments according to principles of the invention.
Figure 14:
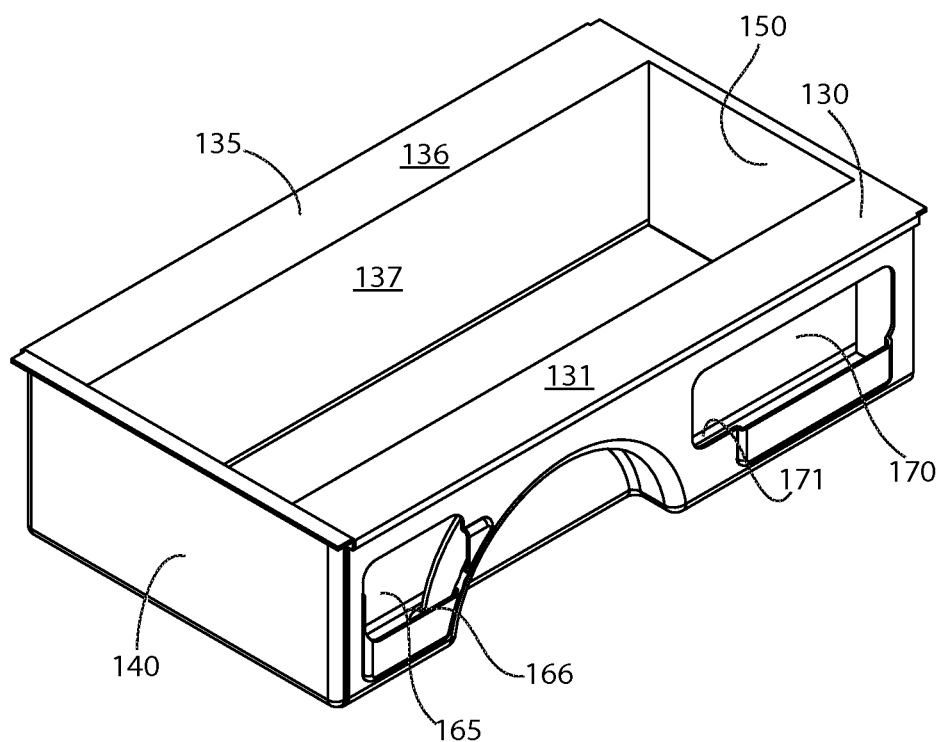
FIG. 14 is a second perspective view of an exemplary bed liner for a pickup truck equipped with storage compartments according to principles of the invention.
Figure 15:
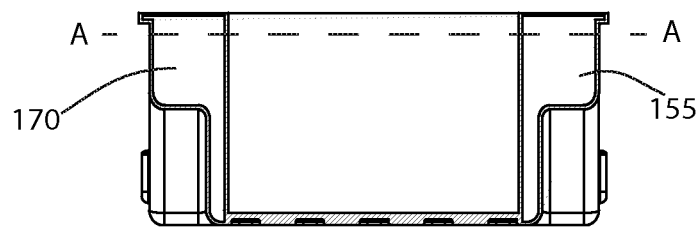
FIG. 15 is a section view of section A-A of an exemplary bed liner for a pickup truck equipped with storage compartments according to principles of the invention.
Figure 16:
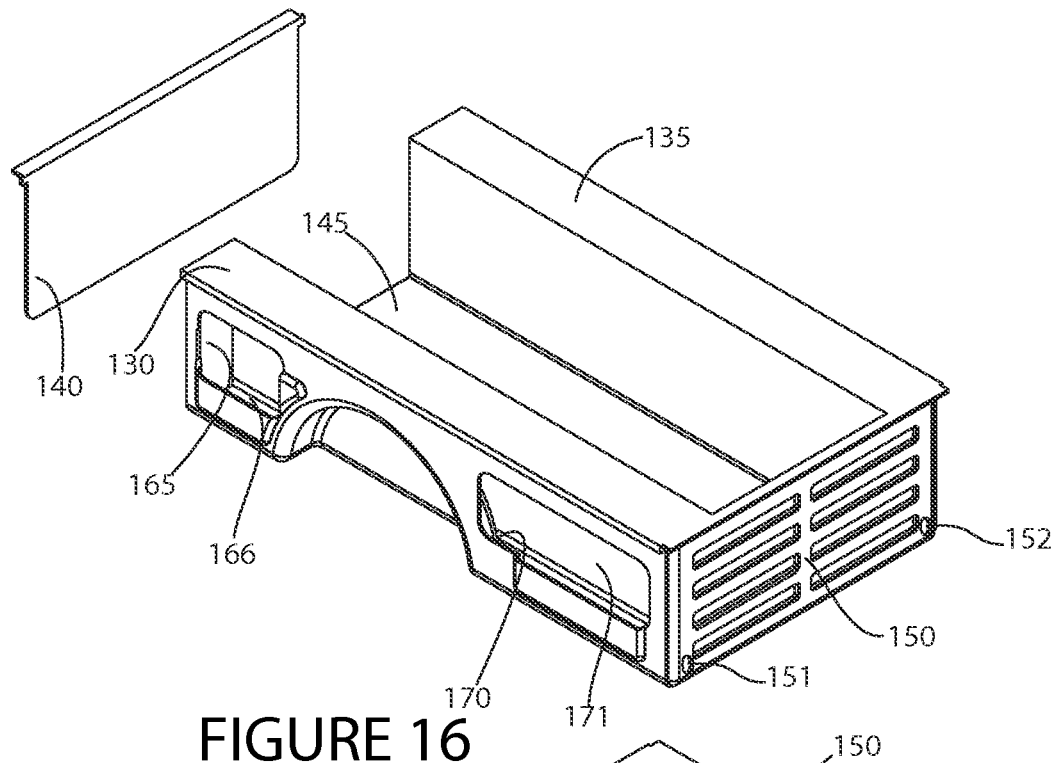
FIG. 16 is a first perspective view of an exemplary bed liner for a pickup truck with a separated tailgate cover according to principles of the invention.
Figure 17:
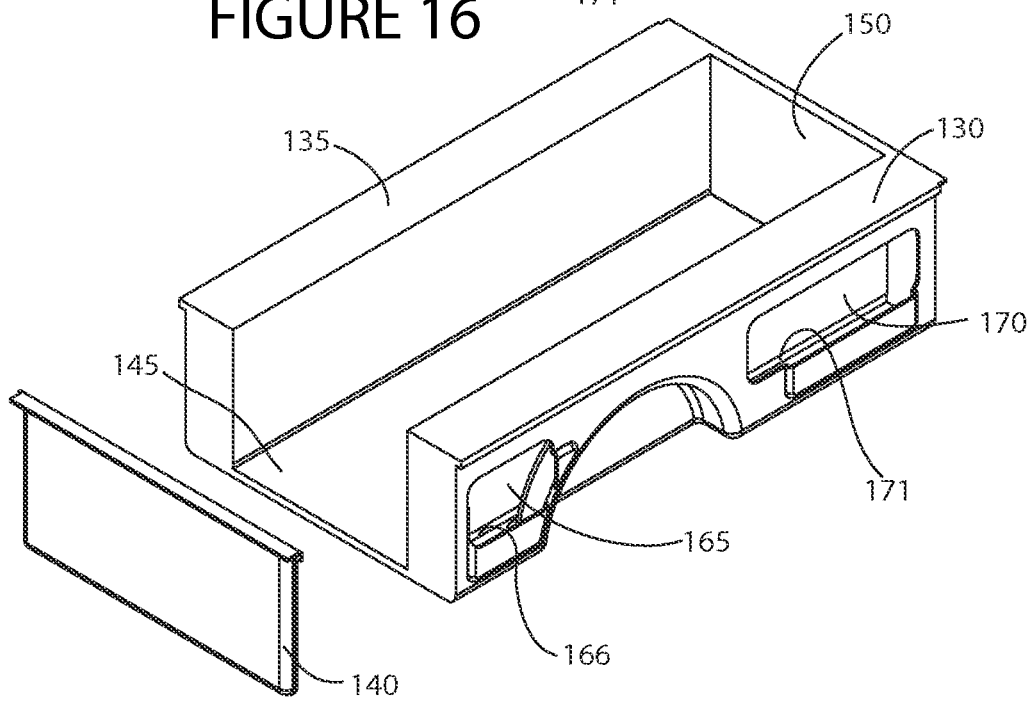
FIG. 17 is a second perspective view of an exemplary bed liner for a pickup truck with a separated tailgate cover according to principles of the invention.

Referring to FIGS. 9 through 11, an exemplary exterior access door 115 for a pickup truck 100 according to principles of the invention is illustrated. The size, shape and position of the door in the bed panels 101, 102 may vary. Doors cannot interfere with wheel wells or fuel tank necks and filler doors. While two spaced apart doors 110, 115 and 120, 125 are shown in each side 101, 102, fewer or more doors may be provided within the scope of the invention. By way of example and not limitation, one door may extend across most of a side 101, 102, above the wheel well. Each door includes a door panel 115, one or more hinges 116, 117, and a lock 119. In the embodiment shown in FIGS. 9 through 11, a mechanical key actuated lock is illustrated. The hinges 116, 117 allow pivoting motion of door 115. Springs and gas cylinders may be provided to facilitate opening and hold the door 115 in an open position. While the doors are shown opening by pivoting up, other hinge configurations may be used within the scope of the invention. For example, the doors may pivot open to one side or another side, or by flipping up or flipping down. The T-shaped handle may be rotated clockwise 90° to lock, and to the position shown in the Figures to unlock the door. Rotation of the T-shaped handle causes the locking tab 119 to rotate. The T-shaped handle may rotate only when its contained locking tumbler is in an unlocked position. Other types of locks and handles may be utilized without departing from the scope of the invention. Such other locks and handles include mechanical and electromechanical locks as typically used on motor vehicles and handles similar to conventional vehicle door handles, without departing from the scope of the invention.

Truck bed liners are protective coatings that shield the inner-side of a truck bed from damage and also create a skid resistant surface allowing any cargo to stay in place, depending on circumstances. There are two broad classifications of bed liners: "Drop-in" and "Spray on/in". "Drop-in" bed liners (aka "pre-formed") are pre-formed structures sized and shaped to be inserted into a truck bed. Spray-in liners comprise sprayable protective coatings that adhere to and cure on the bed. A bed liner according to principles of the invention is a drop-in bed liner. The bed liner 105 may be a unitary structure (except for the tailgate cover 140) or comprised of separate components assembled together to form the bed liner 105. The bed liner 105, whether unitary or an assembly, may be comprised of any material suitable for use as a bed liner, such as, but not limited to hard molded plastic, such as polyethylene.

Referring now to FIGS. 12 through 17, various views of an exemplary bed liner for a pickup truck 100 equipped with storage compartments according to principles of the invention are provided. The exemplary bed liner 105 includes sidewall containers 130, 135, a base (i.e., bottom) 105 and a cab wall 150. A free edge of the webs 131, 136 and 151 form a flange that rests atop the top edges of the truck bed. The liner 105 is sized to fit within the bed of the truck 100, with each container portion 130, 135 fitting along a side of the bed, without extending above the bed of the truck 100 beyond the top of each side panel 101, 102 by any substantial amount. A separate tailgate liner 140 is also provided, though not required by the invention. Each sidewall container 130, 135 is comprised of a generally vertical side wall or panel 132, 137 that extends from the base 105 to a horizontal top web 131, 136. Each top web 131, 136 extends between an outer panel 101, 102 of the truck bed and the vertical side wall 132, 137. The side walls 132, 137, web 131, 136, and each outer panel 101, 102 of the truck bed, define a compartment within the space between each side wall 132, 137 and its respective outer panel 101, 102, beneath each respective web 131, 136. The flange 132, 137 is at about the height of the top of the panels 101 of the truck bed. Each compartment thereby defined may cover a wheel well, which is otherwise unusable space of the truck bed. The containers 130, 135 do not extend much beyond the wheel wells towards the center of the bed. In a preferred embodiment, the flanges are about as long as the bed of the truck and between 2 to 18 inches wide, and more preferably between about 6 to 12 inches wide. In such a configuration, much of the truck bed remains available for conventional storage, between the containers 130, 135. Apertures for each storage compartment 155, 160, 165 and 170 are provided in the outwardly facing side walls of the liner 105. The entire outwardly facing side wall may be omitted, to form a completely open outer facing side. Alternatively, as shown in the drawings, an opening may be provided for each compartment 155, 160, 165 and 170. A bottom shelf 166, 171 may be provided in each compartment 155, 160, 165 and 170.

Optionally, wiring conduits 151, 152 are provided in each container 130, 135. Wiring operably coupled to the truck electric system may be routed through the conduits 151, 152 into the containers 130, 135. The wiring conduits allow lighting and power supply components to be located in the compartments 155, 160, 165 and 170. The lighting and power supply components may include automatic and/or manually activated lights for illuminating each compartment 155, 160, 165 and 170. A 12V DC power outlet may be provided in one or more of the compartments 155, 160, 165 and 170. Electromechanical door locks may be powered using the wiring.

Various accessories may be included in each compartment 155, 160, 165 and 170. The accessories facilitate organization and storage of stored items. Such accessories may include tie-down rings (e.g., D-rings), cargo nets, clamps, shelves, cup holders, removable thermally insulated containers, and removable storage trays.

A storage system formed in a bed of a pickup truck according to principles of the invention includes a bed liner. The bed liner includes a first side container defining a first compartment. The bed includes a first sidewall and a second sidewall. The second sidewall is opposed to and spaced apart from the first sidewall. Each sidewall of the bed has an interior side and an exterior side. The first side container abuts the interior side of the first sidewall of the bed. A first aperture extends through the first sidewall of the bed. The first aperture provides access from the exterior side of the first sidewall, through the first sidewall into the first compartment of the first container. A first door is mounted at the first aperture. The first door is movable from a closed position covering the first aperture to an open position exposing the first aperture.

The bed liner may further include a second side container defining a second compartment. The second side container abuts the interior side of the second sidewall of the bed. A second aperture extends through the second sidewall of the bed. The second aperture provides access from the exterior side of the second sidewall, through the second sidewall into the second compartment of the second container. A second door is mounted at the second aperture. The second door is movable from a closed position covering the second aperture to an open position exposing the second aperture.

The first side container may further define additional compartments, such as a third compartment accessible through a third aperture extending through the first sidewall of the bed. The third aperture may be spaced apart from the first aperture. The third aperture provides access from the exterior side of the first sidewall, through the first sidewall into the third compartment of the first container. A third door may be mounted at the third aperture. The third door is movable from a closed position covering the aperture to an open position exposing the aperture. The third compartment may adjoin the first compartment or be separate and spaced apart from the first compartment.

Similarly, the second side container may further define a fourth compartment accessible through a fourth aperture extending through the second sidewall of the bed. The fourth aperture may be spaced apart from the second aperture. The fourth aperture provides access from the exterior side of the second sidewall, through the second sidewall into the fourth compartment of the second container. A fourth door may be mounted at the fourth aperture. The fourth door is movable from a closed position covering the aperture to an open position exposing the aperture. The second compartment may adjoin or be separate and apart from the fourth compartment.

A base, which serves as the floor cover of the bed liner, extends between and is attached to the first container and the second container.

A wiring conduit extends through at least a part of the first container. The wiring conduit defines a duct through which electrical wiring may be fed. The wiring may supply electrical power (e.g., 12V DC) to outlets and electrical accessories, such as lights, in one or more of the compartments. Shelves may be provided in one or more of the compartments. Each door may include a lock. The lock may comprise a mechanical lock or an electromechanical lock.

A method of forming a storage system in a bed of a pickup truck is also provided. The method entails providing a bed liner. The bed liner may include first and second side containers defining first and second compartments, as described above. The bed includes a first sidewall and a second sidewall. The second sidewall is opposed to and spaced apart from the first sidewall. Each sidewall of the bed has an interior side and an exterior side. The first side container is positioned in abutting relation to the interior side of the first sidewall of the bed, while the second side container is positioned in abutting relation to the interior side of the second sidewall of the bed. A first aperture is cut into the first sidewall of the bed in alignment with the first compartment. A second aperture is cut into the first sidewall of the bed in alignment with the second compartment. Cutting may be performed using a cutting tool suitable for the material comprising the sidewalls. Such cutting tools may include but are not limited to dies, snips, torches, lasers, water jets and saws, and milling tools. The first aperture extends through the first sidewall of the bed and provides access from the exterior side of the first sidewall, through the first sidewall into the first compartment of the first container. The second aperture extends through the second sidewall of the bed and provides access from the exterior side of the second sidewall, through the second sidewall into the second compartment of the second container. A first door is mounted at the first aperture. The first door is movable from a closed position covering the first aperture to an open position exposing the first aperture. A second door is mounted at the second aperture. The second door is movable from a closed position covering the second aperture to an open position exposing the second aperture. Each door is equipped with a lock.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A storage system formed in a bed of a pickup truck, said storage system comprising
   a bed liner, said bed liner including a first side container defining a first compartment, said bed including a first sidewall and a second sidewall, said second sidewall being opposed to and spaced apart from the first sidewall, each sidewall of the bed having an interior side and an exterior side and a top, said first side container abutting the interior side of the first sidewall of the bed, the first side container having a first top and a first flange extending from the first top, and the first flange covering and abutting the top of the first sidewall, and
   a first aperture extending through the first sidewall of the bed, said first aperture providing access from the exterior side of the first sidewall, through the first sidewall into the first compartment of the first side container, and
   a first door mounted at the first aperture, said first door being movable from a closed position covering the first aperture to an open position exposing the first aperture
   said bed liner further including a second side container defining a second compartment, said second side container abutting the interior side of the second sidewall of the bed, the second side container having a second top and a second flange extending from the second top, and the second flange covering and abutting the top of the second sidewall, and
   a second aperture extending through the second sidewall of the bed, said second aperture providing access from the exterior side of the second sidewall, through the second sidewall into the second compartment of the second side container, and a second door mounted at the second aperture, said second door being movable from a closed position covering the second aperture to an open position exposing the second aperture, and said bed liner further including a base extending between and attached to the first container and the second container, said base providing a floor cover for the truck bed, said base having a front end and a rear end, and said bed liner further including a cab wall extending vertically from the front end of the base, the cab wall extending between and being attached to the first container and the second container, said base, first side container, second side container and cab wall being integrally formed and installable as a unit.

2. The storage system formed in a bed of a pickup truck according to claim 1, said first side container further defining a third compartment, a third aperture extending through the first sidewall of the bed, said third aperture being spaced apart from the first aperture, said third aperture providing access from the exterior side of the first sidewall, through the first sidewall into the third compartment of the first container, a third door mounted at the third aperture, said third door being movable from a closed position covering the aperture to an open position exposing the aperture.

3. The storage system formed in a bed of a pickup truck according to claim 2, said third compartment adjoining said first compartment.

4. The storage system formed in a bed of a pickup truck according to claim 2, said third compartment being separate and spaced apart from said first compartment.

5. The storage system formed in a bed of a pickup truck according to claim 2, said second side container further defining a fourth compartment, a fourth aperture extending through the second sidewall of the bed, said fourth aperture being spaced apart from the second aperture, said fourth aperture providing access from the exterior side of the second sidewall, through the second sidewall into the fourth compartment of the second container, a fourth door mounted at the fourth aperture, said fourth door being movable from a closed position covering the aperture to an open position exposing the aperture.

6. The storage system formed in a bed of a pickup truck according to claim 5, said second compartment adjoining said fourth compartment.

7. The storage system formed in a bed of a pickup truck according to claim 5, said second compartment being separate and spaced apart from said fourth compartment.

8. The storage system formed in a bed of a pickup truck according to claim 1, further comprising a wiring conduit extending through at least a part of the first container, said wiring conduit defining a duct through which electrical wiring may be fed.

9. The storage system formed in a bed of a pickup truck according to claim 1, further comprising a first shelf in the first compartment.

10. The storage system formed in a bed of a pickup truck according to claim 1, further comprising a second shelf in the second compartment.

11. The storage system formed in a bed of a pickup truck according to claim 1, further comprising a first door lock on the first door and a second door lock on the second door, said first door lock controlling access to the first aperture, and said second door lock controlling access to the second aperture.

12. The storage system formed in a bed of a pickup truck according to claim 5, further comprising a first door lock on the first door and a second door lock on the second door and a third door lock on the third door and a fourth door lock on the fourth door, said first door lock controlling access to the first aperture, and said second door lock controlling access to the second aperture, said third door lock controlling access to the third aperture, and said fourth door lock controlling access to the fourth aperture.

13. The storage system formed in a bed of a pickup truck according to claim 1, further comprising a first electromechanical door lock on the first door and a second electromechanical door lock on the second door, said first electromechanical door lock controlling access to the first aperture, and said second electromechanical door lock controlling access to the second aperture.

14. The storage system formed in a bed of a pickup truck according to claim 5, further comprising a first electromechanical door lock on the first door and a second electromechanical door lock on the second door and a third electromechanical door lock on the third door and a fourth electromechanical door lock on the fourth door, said first electromechanical door lock controlling access to the first aperture, and said second electromechanical door lock controlling access to the second aperture, said third electromechanical door lock controlling access to the third aperture, and said fourth electromechanical door lock controlling access to the fourth aperture.

15. A method of forming a storage system in a bed of a pickup truck, said method comprising steps of providing a bed liner, said bed liner including a first side container defining a first compartment, said bed including a first sidewall and a second sidewall, said second sidewall being opposed to and spaced apart from the first sidewall, each sidewall of the bed having an interior side and an exterior side and a top, said first side container abutting the interior side of the first sidewall of the bed, the first side container having a first top and a first flange extending from the first top, and the first flange covering and abutting the top of the first sidewall, and said bed liner further including a second side container defining a second compartment, said second side container abutting the interior side of the second sidewall of the bed, the second side container having a second top and a second flange extending from the second top, and the second flange covering and abutting the top of the second sidewall, and said bed liner further including a base extending between and attached to the first container and the second container, said base providing a floor cover for the truck bed, said base having a front end and a rear end, and said bed liner further including a cab wall extending vertically from the front end of the base, the cab wall extending between and being attached to the first container and the second container, said base, first side container, second side container and cab wall being integrally formed and installable as a unit, positioning said first side container in abutting relation to the interior side of the first sidewall of the bed, cutting a first aperture in the first sidewall of the bed in alignment with the first compartment, said first aperture extending through the first sidewall of the bed, said first aperture providing access from the exterior side of the first sidewall, through the first sidewall into the first compartment of the first container, mounting a first door at the first aperture, said first door being movable from a closed position covering the first aperture to an open position exposing the first aperture.

16. The method of forming a storage system in a bed of a pickup truck according to claim 15, said bed liner further comprising a second side container defining a second compartment, and said method further comprising:

positioning said second side container in abutting relation to the interior side of the second sidewall of the bed, and cutting a second aperture through the second sidewall of the bed in alignment with the second compartment, said second aperture providing access from the exterior side of the second sidewall, through the second sidewall into the second compartment of the second container, and mounting a second door at the second aperture, said second door being movable from a closed position covering the second aperture to an open position exposing the second aperture.

17. The method of forming a storage system in a bed of a pickup truck according to claim 16, said first side container further including a first wiring conduit, and said method further comprising running electrical wiring through the first wiring conduit, said electrical wiring supplying electrical power to the first compartment.

18. The method of forming a storage system in a bed of a pickup truck according to claim 17, further comprising equipping the first door with a first lock and the second door with a second lock.

* * * * *